US008401405B2

(12) United States Patent
Barton et al.

(10) Patent No.: US 8,401,405 B2
(45) Date of Patent: Mar. 19, 2013

(54) MONOLITHIC WIDELY-TUNABLE COHERENT RECEIVER

(75) Inventors: Jonathon Barton, Santa Barbara, CA (US); Milan Mashanovitch, Santa Barbara, CA (US)

(73) Assignee: Freedom Photonics, LLC., Santa Barbara, CA (US)

( * ) Notice: Subject to any disclaimer, the term of this patent is extended or adjusted under 35 U.S.C. 154(b) by 271 days.

(21) Appl. No.: 12/789,344

(22) Filed: May 27, 2010

(65) Prior Publication Data

US 2010/0303476 A1 Dec. 2, 2010

Related U.S. Application Data

(60) Provisional application No. 61/182,022, filed on May 28, 2009, provisional application No. 61/182,017, filed on May 28, 2009.

(51) Int. Cl.
*H04B 10/06* (2006.01)
*H04B 10/04* (2006.01)
*H04J 14/02* (2006.01)

(52) U.S. Cl. ............. 398/212; 398/82; 398/87; 398/201

(58) Field of Classification Search ............... 398/82, 398/87, 199, 201, 212
See application file for complete search history.

(56) References Cited

U.S. PATENT DOCUMENTS

| 3,752,992 A | 8/1973 | Fluhr et al. |
| 3,939,341 A | 2/1976 | Graves et al. |
| 3,970,838 A | 7/1976 | Goodwin et al. |
| 3,984,835 A | 10/1976 | Kaplan et al. |
| 4,063,084 A | 12/1977 | Goodwin et al. |
| 4,168,397 A | 9/1979 | Bradley |
| 4,596,052 A | 6/1986 | Wright et al. |
| 4,622,672 A | 11/1986 | Coldren et al. |
| 4,870,654 A | 9/1989 | Cantoni et al. |
| 4,893,352 A | 1/1990 | Welford |
| 4,896,325 A | 1/1990 | Coldren |
| 4,903,341 A | 2/1990 | Rice |
| 4,903,342 A | 2/1990 | Yamazaki |
| 4,904,963 A | 2/1990 | Heidel |
| 5,003,625 A | 3/1991 | Khoe |
| 5,007,106 A | 4/1991 | Kahn et al. |
| 5,008,957 A | 4/1991 | Kiyono |
| 5,034,603 A * | 7/1991 | Wilson ............ 250/227.27 |
| 5,088,105 A | 2/1992 | Scifres et al. |

(Continued)

FOREIGN PATENT DOCUMENTS

WO    WO 95/22070    8/1995
WO    WO 03/079508    9/2003

(Continued)

OTHER PUBLICATIONS

Griffin, R.A, et. al. "Integrated Devices for Advanced Modulation Formats," 2004 IEEE/LEOS Workshop on Advanced Modulation Formats, pp. 39-40, Jul. 1-2, 2004.

(Continued)

*Primary Examiner* — Dalzid Singh
(74) *Attorney, Agent, or Firm* — Knobbe Martens Olson & Bear LLP (57) ABSTRACT

Various embodiments of a coherent receiver including a widely tunable local oscillator laser are described herein. In some embodiments, the coherent receiver can be integrated with waveguides, optical splitters and detectors to form a monolithic optical hetero/homodyne receiver. In some embodiments, the coherent receiver can demodulate the full phase information in two polarizations of a received optical signal over a range of optical wavelengths.

13 Claims, 7 Drawing Sheets

U.S. PATENT DOCUMENTS

| | | | |
|---|---|---|---|
| 5,101,450 A | 3/1992 | Olshansky | |
| 5,126,557 A | 6/1992 | Khoe et al. | |
| 5,170,274 A | 12/1992 | Kuwata et al. | |
| 5,181,136 A | 1/1993 | Kavehrad et al. | |
| 5,222,103 A | 6/1993 | Gross | |
| 5,237,292 A | 8/1993 | Chethik | |
| 5,323,258 A | 6/1994 | Tsushima et al. | |
| 5,347,608 A * | 9/1994 | Nakamura et al. | 385/130 |
| 5,351,317 A * | 9/1994 | Weber | 385/3 |
| 5,359,449 A | 10/1994 | Nishimoto et al. | |
| 5,424,863 A | 6/1995 | Gertel | |
| 5,452,118 A | 9/1995 | Maruska | |
| 6,020,963 A | 2/2000 | DiMarzio | |
| 6,078,412 A | 6/2000 | Fuse et al. | |
| 6,205,159 B1 | 3/2001 | Sesko et al. | |
| 6,271,950 B1 | 8/2001 | Hansen et al. | |
| 6,407,843 B1 | 6/2002 | Rowan et al. | |
| 6,459,521 B1 | 10/2002 | Bakker et al. | |
| 6,584,136 B2 | 6/2003 | Ju et al. | |
| 6,661,975 B1 | 12/2003 | Hall et al. | |
| 6,704,375 B1 | 3/2004 | Serbe | |
| 6,781,741 B2 | 8/2004 | Uesaka | |
| 7,023,601 B2 | 4/2006 | McGhan et al. | |
| 7,027,476 B2 | 4/2006 | Taghavi-Larigani et al. | |
| 7,035,486 B2 | 4/2006 | Griffin et al. | |
| 7,078,981 B2 | 7/2006 | Farag | |
| 7,103,239 B2 | 9/2006 | Kish | |
| 7,116,460 B2 | 10/2006 | Griffin | |
| 7,200,296 B2 | 4/2007 | Kish | |
| 7,209,664 B1 | 4/2007 | McNicol et al. | |
| 7,212,326 B2 | 5/2007 | Wooten et al. | |
| 7,245,788 B2 | 7/2007 | Fujita et al. | |
| 7,272,271 B2 | 9/2007 | Kaplan et al. | |
| 7,366,362 B2 | 4/2008 | Tanimura | |
| 7,457,496 B2 | 11/2008 | Joyner | |
| 7,460,793 B2 | 12/2008 | Taylor | |
| 7,466,882 B2 | 12/2008 | Kish | |
| 7,633,988 B2 | 12/2009 | Fish | |
| 7,751,658 B2 | 7/2010 | Welch | |
| 7,885,492 B2 | 2/2011 | Welch | |
| 2005/0123017 A1 | 6/2005 | Huang et al. | |
| 2005/0163186 A1 | 7/2005 | Petersen | |
| 2005/0213618 A1 | 9/2005 | Sochava et al. | |
| 2006/0193362 A1 | 8/2006 | Kopf et al. | |
| 2007/0122161 A1 | 5/2007 | Charlet et al. | |
| 2007/0133918 A1 | 6/2007 | Cho et al. | |
| 2007/0177882 A1 | 8/2007 | Akiyama | |
| 2007/0230617 A1 | 10/2007 | Tao et al. | |
| 2008/0056727 A1 | 3/2008 | Nishihara et al. | |
| 2008/0080872 A1 | 4/2008 | Tanaka et al. | |
| 2009/0245795 A1 | 10/2009 | Joyner | |
| 2010/0303469 A1 | 12/2010 | Barton et al. | |

FOREIGN PATENT DOCUMENTS

| WO | WO 2008/036313 | 3/2008 |
|---|---|---|

OTHER PUBLICATIONS

Kato, M. et. al., "Transmitter PIC for 10-Channel × 40Gb/s per Channel Polarization—Multiplexed RZ—DQPSK Modulation," in Optical Fiber Communication Conference, OSA Technical Digest (CD) (Optical Society of America, 2009), paper OThN2, Mar. 2009.

Seimetz M. "Performance of Coherent Optical Square-16-QAM-Systems based on IQ-Transmitters and Homodyne Receivers with Digital Phase Estimation," in Optical Fiber Communication Conference and Exposition and the National Fiber Optic Engineers Conference, Technical Digest (CD) (Optical Society of America, 2006), paper NWA4, Mar. 2006.

Seimetz M. "Multi-Format Transmitters for Coherent Optical M-PSK and M-QAM Transmission," Transparent Optical Networks, 2005, Proceedings of 2005 7th International Conference, vol. 2, pp. 225-229, Jul. 2005.

Doerr, C.R., et. al., "Monolithic InP 16-QAM Modulator," in Optical Fiber Communication Conference and Exposition and the National Fiber Optic Engineers Conference, OSA Technical Digest (CD) (Optical Society of America, 2008), paper PDP20, Feb. 2008.

Doerr, C.R., et. al., "Compact High-Speed InP DQPSK Modulator," IEEE, Photonics Technology Letters, vol. 19, No. 15, pp. 1184-1186, Aug. 2007.

Shin, M. et al., "A novel BPSK Method using Multiple Quantum Well Electro-Absorption Modulator Integrated with MMI couplers," International Topical Meeting on Microwave photonics, MWP'99 Digest, pp. 149-152, Nov. 1999.

Griffin, R.A, et. al., "Optical Differential Quadrature Phase-Shift Key (oDQPSK) for High Capacity Optical Transmission, " in Optical Fiber Communications Conference, vol. 70 of OSA Trends in Optics and Photonics (Optical Society of America, 2002), paper WX6, Mar. 2002.

Di, L. et. al., "Single-Facet Folded-Cavity Diode Laser With Ultrasmall Bend Radius High-Index-Contrast Oxidized AlGaAs Ridge Waveguide," IEEE Photonics Technology Letters, vol. 19, No. 8, pp. 598-600, Apr. 2007.

Wang, S. et al., "Analysis of ring distributed feedback lasers," Journal of Applied Physics, vol. 45, No. 9, pp. 3978-3980, Sep. 1974.

Wesstrom, J.O, et. al.,"Design of a Widely Tunable Modulated Grating Y-branch Laser using the Additive Vernier Effect for Improved Super-mode Selection," Semiconductor Laser Conference, 2002, pp. 99-100.

Corzine, S. et al., "10-Channel × 40Gb/s per channel DQPSK Monolithically Integrated InP-based Transmitter PIC," in National Fiber Optic Engineers Conference, OSA Technical Digest (CD) (Optical Society of America, 2008), paper PDP18, Feb. 2008.

Cho, P., et al., "Coherent Homodyne Detection of BPSK Signals Using Time-Gated Amplification and LiNbO$_3$ Optical 90° Hybrid," IEEE Photonics Technology Letter, vol. 16, No. 7, pp. 1727-1729, Jul. 2004.

Cho, P., et al., "Investigation of 2-b/s/Hz 40 Gb/s DWDM Transmission Over 4×100 km SMF-28 Fiber Using RZ-DQPSK and Polarization Multiplexing," IEEE Photonics Technology Letter, vol. 16, No. 2, pp. 656-658, Feb. 2004.

Cho, P., et al., "Transmission of 25-Gb/s RZ-DQPSK Signals with 25-GHz Channel Spacing Over 1000 km of SMF-28 Fiber," IEEE Photonics Technology Letter, vol. 15, No. 3, pp. 473-475, Mar. 2003.

Zhu, B., et al., "High Spectral Density Long-Haul 40-Gb/s Transmission Using CSRZ-DPSK Format," Journal of Lightwave Technology, vol. 22, No. 1, pp. 208-214, Jan. 2004.

Griffin, R.A., et al., "Integrated DQPSK Transmitter for Dispersion-Tolerant and Dispersion-Managed DWDM Transmission," in Optical Fiber Communications Conference, (Optical Society of America, 2003), paper FP6, Mar. 2003.

Cobb, K.W. et al., "Reduction of optical phase noise in semiconductor lasers," Electronics Letters, vol. 18, Issue 8, pp. 336-337, Apr. 15, 1982.

Glance, B., "Performance of AFC for phase noise reduction of optical sources," Electronics Letters,vol. 21, Issue 21, pp. 994-996, Oct. 10, 1985.

Kikuchi, K. et al., "Design theory of electrically frequency-controlled narrow-linewidth semiconductor lasers for coherent optical communication systems," Journal of Lightwave Technology, vol. 5, Issue 9, pp. 1273-1276, Sep. 1987.

Langley et al., "Packaged semiconductor laser optical phase-locked loop (OPLL) for photonic generation, processing and transmission of microwave signals," IEEE Transactions on Microwave Theory and Techniques, vo. 47, pp. 1257-1264, Jul. 1999.

Camatel, S. et al., "Optical phase-locked loop for coherent detection optical receiver," Electronics Letters, vol. 40, No. 6, pp. 384-38518 Mar. 2004.

Ferrero, V. et al., "A novel optical phase locked loop architecture based on sub-carrier modulation", in Optical Fiber Communication Conference, Technical Digest (CD) (Optical Society of America, 2004), paper FN6, Feb. 2004.

Tsukamoto, S. et al., "Coherent demodulation of optical multilevel phase-shift-keying signals using homodyne detection and digital signal processing", IEEE Photonics Technology Letters, vol. 18, No. 10, pp. 1131-1133, May 2006.

Noe, R. "Phase noise-tolerant synchronous QPSK/BPSK baseband-type intradyne receiver concept with feedforward carrier recovery, " Journal of Lightwave technology, vol. 23, No. 2, pp. 802-808, Feb. 2005.

* cited by examiner

MONOLITHIC WIDELY-TUNABLE COHERENT RECEIVER

CROSS-REFERENCE TO RELATED APPLICATIONS

This application claims the benefit under 35 U.S.C. §119(e) of U.S. Provisional Application 61/182,017 filed on May 28, 2009 titled "Chip-Based Advanced Modulation Format Transmitter," which is hereby expressly incorporated herein by reference in its entirety.

This application also claims the benefit under 35 U.S.C. §119(e) of U.S. Provisional Application 61/182,022 filed on May 28, 2009 titled "Monolithic Widely-Tunable Coherent Receiver," which is hereby expressly incorporated herein by reference in its entirety.

BACKGROUND OF THE INVENTION

1. Field of the Invention

Various embodiments of the invention relates to the area of optical communications photonic integrated circuits (PICs). In particular, the embodiments described herein generally relate to receivers for fiber optic or free space communications, and coherent receivers with monolithically integrated tunable local oscillator light sources.

2. Description of the Related Art

High bandwidth time division multiplexing (TDM) links can advantageously reduce the size, weight and/or power required in the system. Receiver architectures are configured to receive and detect time division multiplexed signals are generally designed to operate at a certain bit-rate. It may be desirable to design TDM links and systems that operate at variable bit-rates. In such systems, it may not be possible to use current receiver architectures since it may not be possible to rapidly configure the current coherent receiver devices to detect signals having variable operational bit-rates. Thus, there is a need for a scalable coherent receiver that can switch rapidly to detect different operational bit-rates. For some applications it may be advantageous to have shot noise limited receivers.

SUMMARY

Systems and methods that enable coherent receivers with monolithically integrated tunable local oscillator light that can switch rapidly to detect different operational bit-rates may be beneficial in optical communication networks and systems. Example embodiments described herein have several features, no single one of which is indispensible or solely responsible for their desirable attributes. Without limiting the scope of the claims, some of the advantageous features will now be summarized.

Various embodiments of the devices described herein provide a monolithically integrated semiconductor optical coherent receiver with a monolithically integrated widely tunable local oscillator that can tune to any transmission wavelength in a given range. In some embodiments, the widely tunable laser oscillator can be configured to tune to any transmission wavelength in a given range, wherein the range may be larger than the range that can be achieved by refractive index tuning of the semiconductor material alone. In some embodiments, the tuning range may be greater than approximately 15 nm. In certain embodiments, the tuning range may be approximately 40 nm to 100 nm. In some embodiments, the tuning range may be approximately 20 nm, approximately 25 nm, approximately 30 nm, approximately 35 nm, approximately 40 nm, approximately 45 nm, approximately 50 nm, approximately 55 nm, approximately 60 nm, approximately 65 nm, approximately 70 nm, approximately 75 nm, approximately 80 nm, approximately 85 nm, approximately 90 nm, or approximately 95 nm. In various embodiments, the tuning range can be between any of the values listed above. In some embodiments, the tuning range may be less than approximately 15 nm or greater than approximately 100 nm.

In some embodiments, the coherent receiver can comprise at least two balanced photo detector pairs or four balanced pairs for Quadrature and in-phase inputs, thereby allowing for coherent optical demodulation using an on-chip, fully integrated polarization diversity configuration. In some embodiments, the coherent receiver can include a monolithically integrated polarization beam splitter and/or a polarization-rotator on the same die. Such a configuration may advantageously allow for a single input implementation of the coherent receiver and for the adjustment of the received polarization.

Various embodiments described herein include a compact optical coherent receiver having a reduced die size. For example, the die size of the various embodiments of the optical receiver device described herein can be between approximately 0.5 square mm and approximately 3 square mm. In various embodiments, the die size of the optical receiver device can be between approximately 1.5 square mm and approximately 2.5 square mm. In various embodiments, the die comprises a monolithically integrated optical receiver device that is included in packaging to form the device. In various embodiments, the die can comprise a monolithically integrated optical receiver device that will be coupled to optical fibers or RF/electrical connectors. The decrease in the footprint and/or the die size of the integrated optical receiver device can advantageously reduce fabrication complexity required to integrate a single surface-ridge waveguide structure and improve yield.

In various embodiments described herein, an optical receiver comprising a widely tunable laser, one or more photo detectors and a polarization rotator may be monolithically integrated on a single die having a common substrate is disclosed. In various embodiments, monolithic common substrate integration can include processes and techniques that place all the subcomponents of the device on a common substrate through semiconductor device processing techniques (e.g. deposition, epitaxial growth, wafer bonding, wafer fusion, etc). In some embodiments, the optical receiver comprising a widely tunable laser, one or more photo detectors and a polarization rotator may be integrated on a single die having a common substrate, through other techniques such as flip-chip bonding, etc. Monolithic common substrate integration can provide a reduction in device insertion losses. Such tunable optical receiver devices can be advantageous in reducing the number of components and devices required in an optical system. Other advantages of an integrated tunable optical receiver can be compact die size, reduced footprint, faster tuning mechanisms, and the lack of moving parts—which can be desirable for applications subject to shock, vibration or temperature variation. Integrating an optical receiver on a single die can offer several other advantages as well, such as precise phase control, improved performance and stability of the receiver, and compact implementation. Some additional benefits of integrating a tunable laser with a photo detector on a single die can be: the ability to adjust or optimize the device performance.

Various embodiments, described herein include a complex optical receiver fabricated on a small die size. Such devices can be fabricated using relatively simple fabrication techniques and/or integration platforms. In various embodiments described herein, optical interconnect losses can be reduced by reducing interconnect length rather than by including complex low-loss optical waveguide structures.

Various embodiments of the optical receiver described herein comprise a common substrate comprising a III-V material such as Indium Phosphide and one or more epitaxial layers (InP, InGaAs, InGaAsP, InGaP, InAlGaAs etc.); a laser resonator, formed on the common substrate in the epitaxial structure; and a plurality of photo detectors formed on the common substrate. In various embodiments, the sub-components of the optical receiver such as waveguides, photonic components, splitters, etc. can be formed in the same epitaxial structure as the epitaxial structure in which the laser is formed. In some embodiments the components of the optical receiver such as waveguides, photonic components, splitters, etc. can be formed in one or more epitaxial structures that are different from the epitaxial structure in which the laser is formed.

In various embodiments a monolithically integrated optical receiver die is described. The monolithically integrated optical receiver die can comprise an input interface and at least one monocrystalline substrate. The optical receiver die can further comprise a tunable laser resonator monolithically integrated with the substrate, the tunable laser resonator comprising an output reflector and a tuning section, the tunable laser resonator configured to emit optical radiation from the output reflector along an optical axis, such that the wavelength of the emitted optical radiation is tunable over a wide wavelength range from between about 15 nm to about 100 nm, wherein the wide wavelength range is represented by $\Delta\lambda/\lambda$ and is configured to be greater than a ratio $\Delta n/n$, wherein $\lambda$ represents the wavelength of the optical radiation, $\Delta\lambda$ represents the change in the wavelength of the optical radiation, n represents the refractive index of the tuning section, and $\Delta n$ represents the change in the refractive index of the tuning section. The monolithically integrated optical receiver die also comprises a first optical mixer monolithically integrated with the substrate such that the first optical mixer is disposed at a distance less than approximately 750 μm from the input interface as measured along the optical axis, said first optical mixer having at least a first and a second input waveguide and a plurality of output waveguides, said first input waveguide of the first optical mixer optically connected to the laser resonator, said second input waveguide of the first optical mixer configured to receive a modulated optical signal from the input interface. The monolithically integrated optical receiver die further comprises a second optical mixer monolithically integrated with the substrate such that the second optical mixer is disposed at a distance less than approximately 750 μm from the input interface as measured along the optical axis, said second optical mixer having at least a first and a second input waveguide and a plurality of output waveguides, said first input waveguide of the second optical mixer optically connected to the laser resonator, said second input waveguide of the second optical mixer configured to receive a modulated optical signal from the input interface. In various embodiments, a polarization rotator can be monolithically integrated with substrate, said polarization rotator arranged at an angle between about 20 deg and 160 deg or between about −20 deg and −160 deg with respect to the optical axis. In various embodiments, the polarization rotator may be disposed at an angle θ between about 20 degrees and 160 degrees or between about −20 degrees and −160 degrees with respect to the crystallographic axis of the monocrystalline substrate. A plurality of photo detectors can be further monolithically integrated with substrate, each of the plurality of photo detectors being optically connected to one of the plurality of output waveguides of the first or the second optical mixer.

In various embodiments a monolithic tunable polarization rotator is described herein. The monolithic tunable polarization rotator can comprise a monocrystalline substrate; an optical splitter comprising an input waveguide and at least two output waveguides; a plurality electrodes disposed on each the at least two output waveguides, of the optical splitter, said plurality of electrodes configured to control an amplitude and a phase of the electromagnetic radiation propagating in the at least two output waveguides; and an optical coupler comprising at least one output waveguide, said optical coupler configured to receive input from the at least two output waveguides of the optical splitter.

In various embodiments, a method of manufacturing a monolithically integrated optical receiver die is described. The method comprises providing an input interface; and providing at least one monocrystalline substrate. The method further comprises monolithically integrating a tunable laser resonator with the substrate, said tunable laser resonator comprising an output reflector and a tuning section, said tunable laser resonator configured to emit optical radiation from the output reflector along an optical axis, such that the wavelength of the emitted optical radiation is tunable over a wide wavelength range from between about 15 nm to about 100 nm, wherein the wide wavelength range is represented by $\Delta\lambda/\lambda$ and is configured to be greater than a ratio $\Delta n/n$, wherein $\lambda$ represents the wavelength of the optical radiation, $\Delta\lambda$ represents the change in the wavelength of the optical radiation, n represents the refractive index of the tuning section, and $\Delta n$ represents the change in the refractive index of the tuning section. The method also comprises monolithically integrating a first optical mixer with the substrate such that the first optical mixer is disposed at a distance less than approximately 750 μm from the input interface as measured along the optical axis, said first optical mixer having at least a first and a second input waveguide and a plurality of output waveguides, said first input waveguide of the first optical mixer optically connected to the laser resonator, said second input waveguide of the first optical mixer configured to receive a modulated optical signal from the input interface. In the method of manufacturing described herein a second optical mixer can be monolithically integrated with the substrate such that the second optical mixer is disposed at a distance less than approximately 750 μm from the input interface as measured along the optical axis, said second optical mixer having at least a first and a second input waveguide and a plurality of output waveguides, said first input waveguide of the second optical mixer optically connected to the laser resonator, said second input waveguide of the second optical mixer configured to receive a modulated optical signal from the input interface. The method further comprises monolithically integrating a polarization rotator with substrate, said polarization rotator arranged at an angle between about 20 deg and 160 deg or between about −20 deg and −160 deg with respect to the optical axis; and monolithically integrating a plurality of photo detectors with substrate, each of the plurality of photo detectors being optically connected to one of the plurality of output waveguides of the first or the second optical mixer. In various embodiments, the polarization rotator may be disposed at an angle θ between about 20 degrees and 160 degrees or between about −20 degrees and −160 degrees with respect to the crystallographic axis of the monocrystalline substrate.

These and other features will now be described with reference to the drawings summarized above. The drawings and the associated descriptions are provided to illustrate embodiments and not to limit the scope of the disclosure or claims. Throughout the drawings, reference numbers may be reused to indicate correspondence between referenced elements. In addition, where applicable, the first one or two digits of a reference numeral for an element can frequently indicate the figure number in which the element first appears.

DETAILED DESCRIPTION OF THE PREFERRED EMBODIMENT

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied using a variety of techniques including techniques that may not be described herein but are known to a person having ordinary skill in the art. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein. It will be understood that when an element or component is referred to herein as being "connected" or "coupled" to another element, it can be directly connected or coupled to the other element or intervening elements may be present therebetween.

Figure 1:
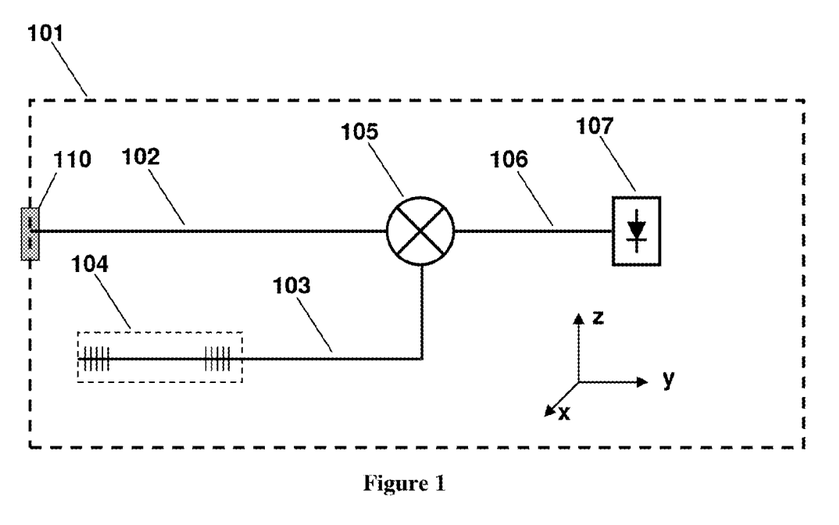
FIG. 1 schematically illustrates an embodiment of a monolithically integrated receiver comprising a tunable laser and an optical mixer.

FIG. 1 illustrates an embodiment of a receiver comprising a tunable laser and a photo detector. The embodiment illustrated in FIG. 1, comprises a common substrate 101. In some embodiments, the receiver can comprise one or more epitaxial structures formed on the common substrate. In various embodiments, the one or more epitaxial structures can include layers or stacks of layers grown, deposited or formed on the common substrate such that the one or more layers have a lattice structure and orientation substantially similar to the common substrate. The receiver can further comprise a first optical waveguide 102 configured to receive an external optical input signal that is integrally disposed on the common substrate; a widely tunable local oscillator/laser resonator 104 integrally disposed on the common substrate in the same or different epitaxial structure as the first optical waveguide 102; a second optical waveguide 103 disposed in the same epitaxial structure as the local oscillator 104 and optically coupled to the local oscillator 104; an optical mixer (or coupler) structure 105 disposed on the common substrate and disposed external to the local oscillator 104; and at least one photo detector 107, integrally disposed on the common substrate. In various embodiments, the receiver die can comprise an input interface 110 through which the external modulated optical signal is coupled into the receiver die. In various embodiments, an optional mode converter can be integrated at an input edge of the first optical waveguide 102 to improve the coupling efficiency of the external modulated optical signal. In various embodiments, the input interface 110 can comprise an input facet of the receiver die. In some embodiments, the input interface 110 may comprise the mode converter. In various embodiments, the optical mixer 105 may be disposed at a distance of approximately 750 μm from the input interface as measured along the optical axis. In various embodiments, the optical mixer 105 can be disposed at a distance of approximately 750 microns or less from the input interface as measured along a horizontal direction parallel to a first edge of the die (e.g. along the y-axis). In various embodiments, the optical mixer structure 105 is configured to mix (or combine) the optical signal from the second optical waveguide 103 with the external input optical signal from the first optical waveguide 102. The optical mixer structure 105 can include at least one output waveguide 106 which is optically connected to the photo detector 107. The photo detector can be configured to detect the combined output signal from the optical mixer 105. In various embodiments, the photo detector can comprise a photodiode. Other photo sensors can also be used in various embodiments. These and other features are further described below.

Monocrystalline Substrate

In various embodiments, the monocrystalline substrate 101 may comprise one or more epitaxial structures. In various embodiments, an epitaxial structure may be formed by a method of depositing a monocrystalline film on a monocrystalline substrate. In various embodiments, epitaxial films may be grown from gaseous or liquid precursors. Because the substrate acts as a seed crystal, the deposited film takes on a lattice structure and orientation identical to those of the substrate. In various embodiments, the epitaxial structure comprises InGaAsP/InGaAs or InAlGaAs layers on either a GaAs or InP substrate grown with techniques such as MOCVD or Molecular Beam Epitaxy (MBE) or with wafer fusion of an active III-V material to a silicon-on-insulator (SOI) material.

Laser Resonator

As discussed above in various embodiments, the laser resonator 104 may be formed on the common substrate and/or in one or more epitaxial structures formed on the common substrate. In various embodiments, the laser resonator 102 can include a widely tunable laser. As discussed above, in various embodiments, the one or more epitaxial structures can include layers or stacks of layers grown, deposited or formed on the common substrate such that the one or more layers have a lattice structure and orientation substantially similar to the common substrate. In various embodiments, the widely tunable laser can comprise a lasing cavity disposed between two mirrors or reflectors and a tuning section. The optical radiation or laser light generated by the widely tunable laser is output from the reflector disposed closer to the output side of the laser cavity (output reflector) along an optical axis. In various embodiments of the optical transmitter device the optical axis can be aligned parallel to the crystallographic axis of the monocrystalline substrate 101 (e.g. 011 axis for an InP substrate). In the embodiment illustrated in FIG. 1, the optical axis can be aligned parallel to the +y axis.

In various embodiments, the wavelength of the optical radiation emitted from the widely tunable laser can be tuned over a wide wavelength range from between about 15 nm to about 100 nm. Without subscribing to any particular theory, in various embodiments, the widely tunable laser can have a relative wavelength change ($\Delta\lambda/\lambda$) that is larger than the available relative index tuning ($\Delta n/n$) inside the laser cavity, wherein $\lambda$, represents the wavelength of the optical radiation, $\Delta\lambda$ represents the change in the wavelength of the optical radiation, n represents the refractive index of the tuning section, and $\Delta n$ represents the change in the refractive index of the tuning section. The widely tunable laser oscillator can be configured to tune to any transmission wavelength in a given range, wherein the range may be larger than the range that can be achieved by refractive index tuning of the semiconductor material and/or the tuning section alone. Without subscribing to any particular theory, the wide wavelength tuning in some embodiments of the widely tunable laser can be achieved by using the Vernier effect, in which the two mirrors or reflectors defining the lasing cavity have multiple reflection peaks. The lasing wavelength is then defined by the overlap between one reflection peak of each mirror. Tuning the index in one of the mirrors or the tuning section (e.g. by applying a voltage to electrodes disposed on the mirrors and/or the tuning section) can shift the wavelength of each of the many reflections, causing a different pair of reflection peaks to come into alignment, thus shifting the lasing wavelength further than that of the wavelength shift of the tuned mirror.

In various embodiments, the widely tunable laser as described herein can have a tuning range from about 15 nm to about 100 nm around 1550 nm. In some embodiments, the laser resonator 104 can have a tuning range that is greater than approximately 15 nm. In certain embodiments, the tuning range may be approximately 40 nm to 80 nm. In some embodiments, the tuning range may be approximately 20 nm, approximately 25 nm, approximately 30 nm, approximately 35 nm, approximately 40 nm, approximately 45 nm, approximately 50 nm, approximately 55 nm, approximately 60 nm, approximately 65 nm, approximately 70 nm, approximately 75 nm, approximately 80 nm, approximately 85 nm, approximately 90 nm, or approximately 95 nm. In certain embodiments, the tuning range may have a value between any of the values provided above. In some embodiments, the tuning range may be less than approximately 15 nm or greater than approximately 100 nm.

In various embodiments, the laser oscillator can include any of a variety of widely tunable lasers such as, for example, Sampled Grating Distributed Bragg Reflector (SGDBR) lasers, Superstructure grating Distributed Bragg reflector, Digital Supermode Distributed Bragg Reflector (DSDBR), Y-branch or folded tunable laser, etc.

Optical Mixer

In various embodiments, the optical mixer 105 can comprise without limitation a multimode interference coupler, evanescent coupled-mode coupler, reflection coupler, or Y-branch coupler, and can have at least 2 input waveguides and one or more output waveguides 106. One function of the mixer 105 can be to mix the light generated from the laser oscillator 104 and the external optical signal coupled into the first optical waveguide 102. The two or more signals can be coupled in equal or unequal ratios. To simplify control of the coupling ratio, in various embodiments, an electrode can be integrated with the mixer 105. One purpose of the electrode can be to change the optical index in the mixer 105 that can change the coupling ratio. In various embodiments, the mixer 105 can be designed to reduce or prevent reflections of the laser 104 back into the laser cavity by ensuring that the input waveguides of the mixer 105 are arranged at an obtuse angle with respect to the output waveguides 106.

Photo Detector

As discussed above in various embodiments, the photo detector 107 can be integrated with the common substrate 101, in the same or different epitaxial structure as other components. In various embodiments, the photo detector 107 is disposed at one end of the output waveguide 106. In some embodiments, the waveguide 106 and the photo detector 107 can be terminated in such a way as to reduce or minimize the reflection back into the laser oscillator 104. In some embodiments, the waveguide 106 and the photo detector 107 can be arranged such that any reflected optical radiation is dispersed into the substrate. In some embodiments the waveguide can 106 can comprise a very low reflection angled, tapered waveguide.

In some embodiments, the optical mixer 105 can comprise two or more output waveguides. Photo detectors can be located along each output waveguide. The two photo detectors can be interconnected in such a way that only the differential electrical signals may be added, and the common signals for both detectors can be subtracted and cancelled out. This can be achieved either on-chip, by connecting the two detectors in series, or off-chip, where a differential amplifier selectively amplifies the difference in photocurrent between the two photo detectors.

Other Optical/Photonic Components

In various embodiments, light can be coupled into the optical receiver die using an optical fiber or a lens system through an input interface 110. In some embodiments, the input interface 110 can include the input facets on an input side of the optical receiver. In some embodiments, a mode-converter can be integrated with the first optical waveguide 102. In various embodiments, the mode converter can include a structure that converts the shape of the optical mode in the waveguide 102 to better match that of input optical fiber or lens to improve coupling between the external fiber and the substrate waveguide. A mode-converter may be formed using several methods and techniques. One approach can be to taper the optical waveguide such that the waveguide is transformed from a buried ridge structure to a surface ridge structure. Without subscribing to any particular theory, a buried ridge structure can include a waveguide structure where the waveguide is clad with cladding material other than air all around. Without subscribing to any particular theory, surface ridge can include a waveguide structure where guiding is provided by index variation in the cladding region (includes for example, between semiconductor and air).

In some embodiments, a semiconductor optical amplifier can be integrally disposed on the common substrate 101 in the same or different epitaxial structure. The semiconductor optical amplifier can be diposed along the first optical waveguide 102 and/or along the second optical waveguide 103. The semiconductor optical amplifier can provide optical waveguide gain to compensate for optical coupling losses and optical propagation losses in the first or second optical waveguides 102 and 103. Similarly, optical amplifiers can also be disposed in waveguide sections after the mixer 105 along the output optical waveguide 106.

Optical Polarization Controlling Components

Several components of the receiver can be polarization sensitive. For example, in some embodiments, the optical mixer 105 may be of the type that only creates coherent beam combination if the polarization of the two input signals is matched. Polarization beam splitters and rotators can be integrated on the common substrate 101 in the same or different epitaxial structure as other components to generate polarization independent operation of the die.

In various embodiments, the polarization beam splitter elements may be formed on the common substrate 101, in the same or different epitaxial structure as other components, with the purpose of splitting the input coupled light into the TE and TM polarized modes of the common waveguide. One embodiment of this element can be realized by using the phenomenon of birefringence between two modes. A polarization rotating element can convert TM polarized light into TE polarized light and vice versa.

A polarization rotator can be formed by inducing a birefringence in the waveguide, for example, by fabricating an asymmetric waveguide. An asymmetric waveguide can be fabricated by etching the sidewall of the optical waveguide at an angle. By selecting the appropriate length of the angled etch, a halfwave plate can be formed that can rotate linearly polarized TE or TM light by 90 degrees. Other approaches and designs can also be used.

Figure 2A:
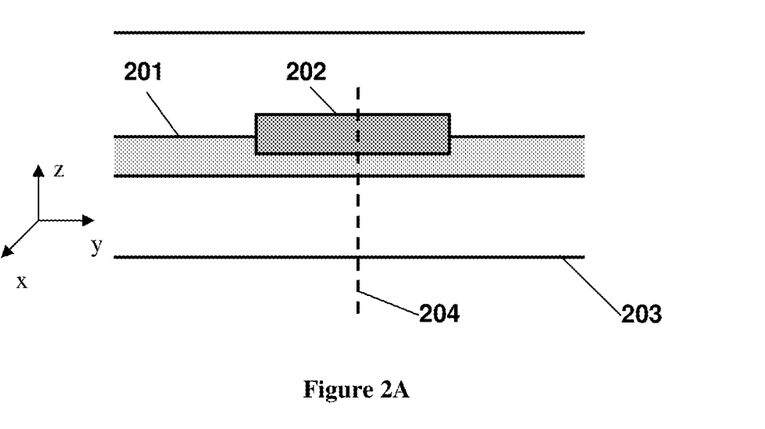
FIGS. 2A-2C schematically illustrate various embodiments of a monolithically integrated optical polarization rotator.
Figure 2B:
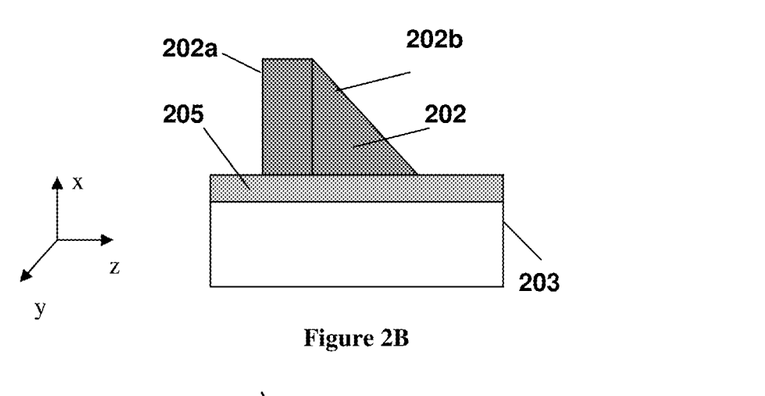

FIG. 2A schematically illustrates top view of an embodiment of a polarization rotator that can be integrated in the optical receiver. FIG. 2B schematically illustrates a cross-sectional view of the polarization rotator illustrated in FIG. 2A along an axis 204 parallel to the normal to the substrate 203 (e.g. parallel to the z-axis). In one embodiment, the polarization rotator comprises an asymmetric waveguide ridge 202 that is disposed on a substrate 203. In various embodiments, the polarization rotator can be formed by modifying a waveguide section 201 of the optical transmitter device using semiconductor device processing techniques. In various embodiments, the asymmetric waveguide ridge 202 can be formed on a slab waveguide 205 which comprises a high-index material. In some embodiments, the waveguide ridge 202 can have a first edge 202a disposed at a first angle with respect to the normal to the substrate and a second edge 202b disposed at a second angle with respect to the normal to the substrate. In various embodiments, the first and the second angle can be different from each other. In various embodiments, the first angle can be approximately parallel to the normal to the substrate as shown in FIG. 2B. The asymmetric nature of waveguide ridge 202 results in a bi-refringent waveguide structure.

As discussed above, the asymmetric waveguide structure 202 can be formed by using an etching process. For example, in one method of fabricating the polarization rotator, the asymmetric waveguide structure 202 is dry etched on one side of the waveguide ridge 202 to form the edge 202a, and wet etched on the other side of the waveguide ridge 202 to form the sloping edge 202b. In some embodiments, the method can include etching through the slab waveguide 205. Etching through the slab waveguide 205 can be advantageous to realize a polarization rotator structure with reduced footprint.

In one method of fabricating the polarization rotator on an InP substrate, the sloping edge 202b can be formed by employing a wet etch at a waveguide section oriented around 90 degrees with respect to the laser ridge—which gives around 40-50 degrees wet etch plane—that stops on the InGaAsP or InAlGaAs waveguide core (e.g. slab waveguide 205) or a stop etch layer. If a different orientation is chosen for the polarization rotator (e.g. perpendicular to or within 20-160 degrees or −20 to −160 degrees from the laser axis) the wet etch will align the waveguide edge to an angle not perpendicular to the substrate. The above described method of fabricating the polarization rotator can be a repeatable process and can yield polarization rotators with a small footprint.

Figure 2C:
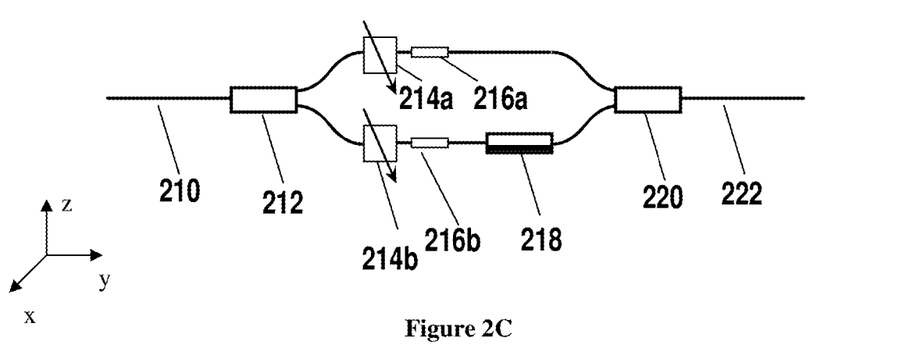

FIG. 2C illustrates an embodiment of a tunable polarization rotator which can be integrated with the optical receiver. The tunable polarization rotator comprises an input waveguide 210 that is connected to an optical splitter 212 having with two output waveguides. Electrodes 214a, 214b, 216a and 216b may be provided to the two output waveguides. In various embodiments, the optical splitter 212 can be a polarization beam splitter. A voltage between approximately 1V to approximately −6V can be applied to the electrodes 214a and/or 214b to change the transmitted optical intensity. An electric current in the range of approximately, 0 mA to approximately 15 mA may be provided to the electrodes 216a and/or 216b to adjust the phase of the optical radiation propagating through the output waveguides. In various embodiments, the voltage and the current can be provided by using an external drive circuit. The tunable polarization rotator can further comprise a polarization rotator 218 that can be disposed in one of the output waveguides. The polarization rotator 218 can be similar to the various embodiments of the polarization rotators described above. The tunable polarization rotator can further comprise an optical coupler 220 having an output waveguide 222 and configured to combine the optical outputs of the two output waveguides of splitter 212. With the appropriate adjustment of optical phase and intensity, the polarization state of the signal in the output waveguide 222 can be tuned.

Some Preferred Embodiments

Some preferred embodiments are described below. It is understood that these represent a few possible embodiments out of a range of possible embodiments that have some similarities to the embodiment illustrated in FIG. 1 and the sub-components described therein.

Embodiment 1

Figure 3:
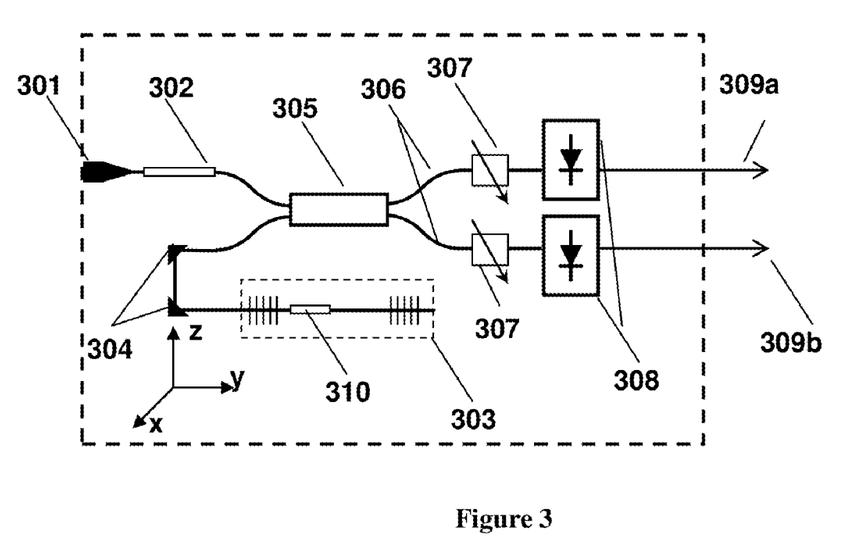
FIG. 3 schematically illustrates an embodiment of a folded balanced receiver including a tunable laser, a 2×2 optical coupler and a photo detector.

FIG. 3 illustrates an embodiment of a coherent receiver that is formed on a common substrate. In the illustrated embodiment, an external modulated optical signal is coupled into a first waveguide integrally formed on the common substrate. Improved optical coupling efficiency to the integrated receiver can be achieved through integration of a mode-converter 301. In various embodiments, the receiver die may comprise an input interface through which the external modulated optical signal is input to the receiver die and coupled into a waveguide such that the incoming external optical modulated optical signal propagates along a direction parallel to the +y-axis. In various embodiments the input interface may comprise an input facet and/or the mode converter 301. The external modulated optical signal can have a modulation bandwidth in the range of approximately 5 GHz to approximately 50 GHz. The external modulated optical signal can have an optical power between about −50 dBm and about 10 dBm. An optional optical amplifier (e.g. a semiconductor optical amplifier SOA) 302 can be used to compensate for coupling losses and passive waveguide loss. In some embodiments, the optical amplifier can be polarization sensitive and have different optical gain for TE and TM modes. The illustrated receiver embodiment further comprises a widely tunable local oscillator (LO) laser 303 monolithically integrated on the common substrate. The LO 303 may include a tuning section 310. In some embodiments, the LO may be configured to emit optical radiation along an optical axis in a direction opposite to the direction of the incoming external optical signal (e.g. along a direction parallel to the −y-axis). In some embodiments, the direction of the light emitted from the laser can be changed by about 180 degrees such that the light emitted from the LO 303 propagates in a direction parallel to the direction of propagation of the incoming optical signal (e.g. in a direction parallel to the +y-axis). The 180 degree reflection can be achieved by forming a 180 degree waveguide turn. In some embodiments the 180 degree waveguide turn can be achieved either by a curved waveguide segment, or by using a combination of waveguides and total internal reflection mirrors 304.

In various embodiments, total internal reflection (TIR) mirrors 304 can also be integrally disposed on the common substrate. A preferred embodiment of a TIR mirror can comprise a high index-contrast dielectric-semiconductor interface that allows discrete reflection of the optical mode between two waveguides. One purpose of these structures can be to reflect the optical radiation propagating in the waveguide at an angle. In some embodiments, the TIR mirror can comprise at least one reflective facet arranged at an angle θ with respect to the waveguide that is configured to change the direction of propagation of the optical radiation by approximately 90 degrees-approximately 180 degrees. TIR mirrors can also be disposed at the input and/or output of optical couplers and splitter to allow a rapid transversal displacement of the optical radiation. This arrangement can be advantageous to achieve a compact fan-out of input or fan-in of output optical waveguides from optical splitters and optical couplers in contrast to the more commonly used S-bends which require a gradual fan-out to maintain low optical loss. In various embodiments, the use of TIR mirrors can enable a reduction in the die size or the footprint of the device since the input and output waveguides can be fanned-out or fanned-in to achieve the desired separation between the various subcomponents in relatively less space. Furthermore, the lengths of optical waveguides can be shortened in devices using TIR mirrors so as to reduce optical propagation losses. Various embodiments, comprising S-bends to fan-out or fan-in the input and output waveguides would likely result in an increase in the die size or the footprint of the device, since the lengths of the waveguides with S-bends and/or the radius of curvature of the S-bends cannot be reduced beyond a certain minimum (e.g. in various embodiments, S-bends can exhibit increased loss if the radius of curvature is less than 50 microns) without increasing waveguide losses or complicating the integration platform. Use of TIR mirrors is thus advantageous to realize complex devices having reduced die size and footprint by using a simple integration platform. Nevertheless, there may be embodiments in which S-bends, deeply etched waveguide bend or other waveguide structures may be more preferable than TIR mirrors to achieve fan-out of input or fan-in of output optical waveguides from the optical splitters and optical couplers.

The illustrated embodiment can further include a 2×N or an M×N type mixer 305 to couple the external modulated optical signal and the laser light from the LO 303. In various embodiments, the mixer may be disposed at a distance of about 750 μm from the input interface as measured along the optical axis. In various embodiments, the optical mixer 305 can be disposed at a distance of approximately 750 microns or less from the input interface as measured along a horizontal direction parallel to a first edge of the die (e.g. along the y-axis). In various embodiments, the mixer 305 can be a multimode interference type. Other types of mixers such as those described above or otherwise commonly known in the art can be used in some embodiments. The mixer 305 can include at least two output waveguides 306 which are optically coupled to one or more photo detectors 308. In various embodiments, the mixed output in one of the output waveguides can have a relative phase difference φ, between the phase of the external modulated optical signal and the phase of the local oscillator LO, while the mixed output in the other output waveguide can have a relative phase difference of φ±180 degrees, between the phase of the external modulated optical signal and the phase of the local oscillator LO. In some embodiments, one or more trimming pads or electrodes 307 can be disposed along the two output waveguides 306 positioned before the one or more photo detectors 308. Voltage can be provided to one or both of the electrodes 307 through a drive circuit to adjust the relative absorption in the two output waveguides. In various embodiments, the applied voltage may apply a reverse bias to the electrodes 307 and attenuation of the light propagating through the waveguides 306 can be achieved by utilizing Franz Keldysh or quantum Stark effect. The electrodes can generate a weak absorption to attenuate the optical signal propagating in one or both of the output waveguides to balance or substantially equalize the optical power input to the two balanced photo detectors 308.

The one or more photo detectors 308 can be integrated with the common substrate, in the same or different epitaxial structure as the other components. The photo detectors 308 can comprise SiGe, InGaAs, InGaAsP, Si, etc. The photo detectors can have a bandwidth ranging from approximately 5 GHz to approximately 50 GHz and be configured to generate a photo-current in the range of approximately 0.1 mA and 20 mA. In general, the output of the photo detectors 308 can correspond to the amplitude and/or phase of the modulated signal. For example, in some embodiments, the electrical output signal 309*a* can correspond to the amplitude and the phase of the external modulated optical signal, while the electrical output signal 309*b* can correspond to only the amplitude of the external modulated optical signal. The information related to the phase of the external modulated optical signal can be obtained by subtracting the output signal 309*b* from the output signal 309*a* or vice versa. Alternatively, the two photo detectors can be coupled in series on the die such that the differential component of the output is transmitted out in a single connection. In various embodiments, the phase information obtained can be used to derive a feedback or tuning signal which can be provided to the tuning section 310 of the LO 303 through an external or an on-chip feedback loop. The tuning signal can be provided to the tuning section 310 in the form of a current or a voltage which can change the optical frequency (or wavelength) of the emitted laser light.

Embodiment 2

Figure 4:
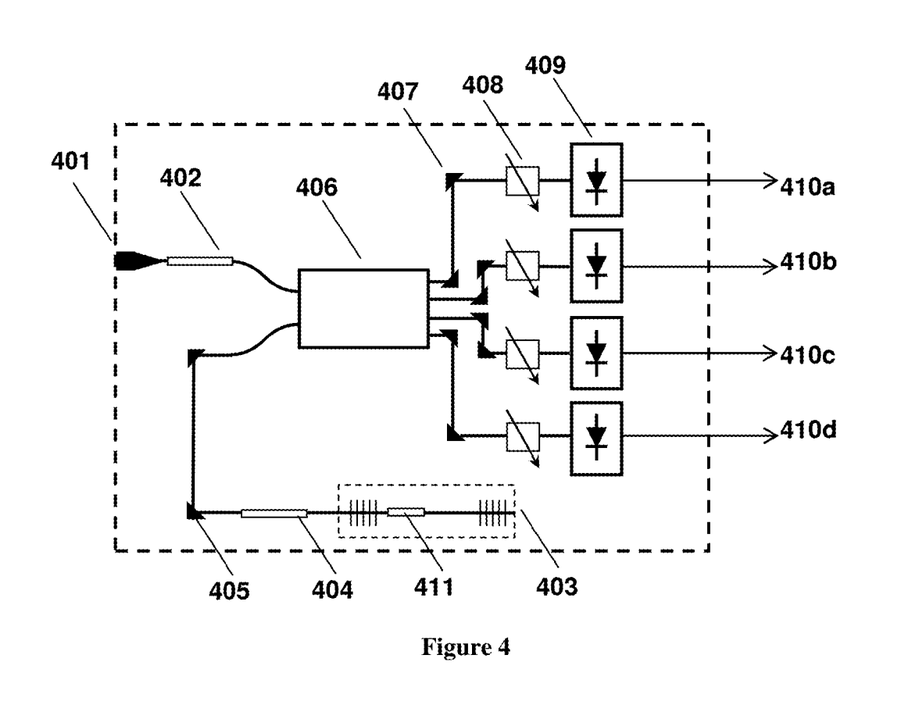
FIG. 4 schematically illustrates a folded I/Q receiver including a tunable laser, a 2×4 optical hybrid coupler and two sets of balanced (I and Q) receivers.

FIG. 4 illustrates another embodiment of a coherent receiver device. As discussed above, the illustrated receiver device can be formed on a common substrate comprising at least one monocrystalline substrate. The receiver comprises an input waveguide configured to receive an external modulated optical signal, a local oscillator 403, an optional optical amplifier 404 disposed at the output of the LO 403, TIR mirrors 405, a 2×4 or 2×N optical mixer 406 and a plurality of photo detectors/photodiodes 409. In various embodiments, the output waveguides of the mixer 406 can be rapidly fanned-out by using a plurality of TIR mirrors 407. In various embodiments, the mixed output in one of the output waveguides can have a relative phase difference φ, between the phase of the external modulated optical signal and the phase of the local oscillator LO, while the mixed output in a second output waveguide can have a relative phase difference of φ±90 degrees, between the phase of the external modulated optical signal and the phase of the local oscillator LO. The mixed output a third output waveguides can have a relative phase difference φ±180 degrees, between the phase of the external modulated optical signal and the phase of the local oscillator LO, while the mixed output in a fourth output waveguide can have a relative phase difference of φ±270 degrees, between the phase of the external modulated optical signal and the phase of the local oscillator LO.

In various embodiments, the equivalent structure can be formed by a network of 1×2 and 2×2 optical mixers, together with optical phase trimming pads 408 which in various embodiments can be structurally and functional similar to electrodes 307 of FIG. 3. As discussed above, trimming pads 408 can be used to balance the optical power in the four output waveguides of the mixer 406 which are input to the plurality of photo detectors 409. The output signals 410a-410d from the photo detectors 409 can comprise optical amplitude-plus-in-phase information; optical amplitude-minus-in-phase information; amplitude-plus-quadrature-phase information; and optical amplitude-minus-quadrature-phase information. Alternatively, by connecting pairs of photo detectors 409 in series, the in-phase and quadrature-phase information can be transmitted out through two output signals. In this arrangement the total optical phase information, including any sine and cosine components can then be recovered from the four complementary outputs. As discussed above with reference to FIG. 3, the optical phase information can be used to derive a control signal which can be provided to the tuning section 411 of the LO 403 by a feedback circuit to change the optical frequency (or wavelength) of the LO 403.

Embodiment 3

Figure 5:
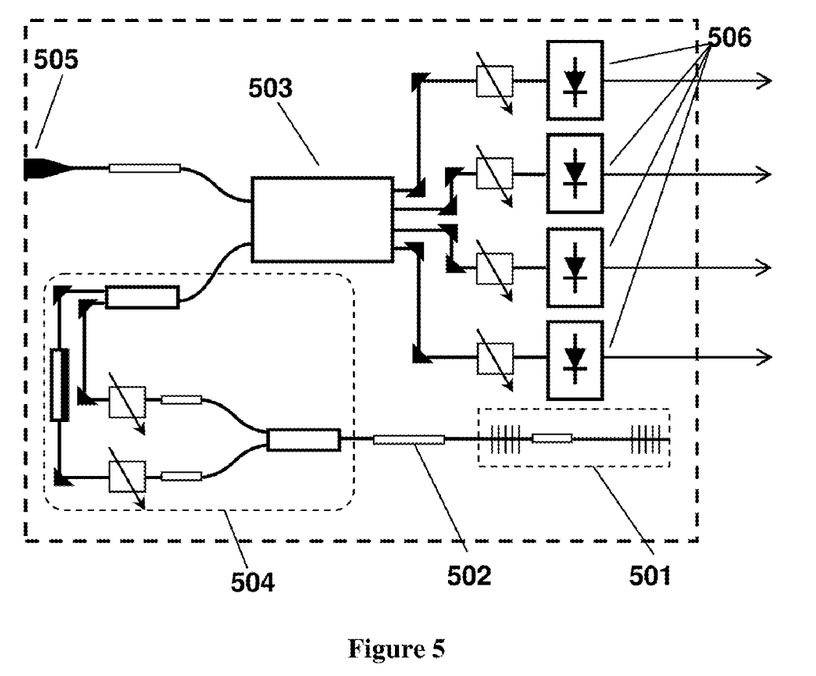
FIG. 5 schematically illustrates a folded I/Q receiver including a tunable laser, a tunable polarization rotator, 2×4 optical hybrid coupler and two sets of balanced (I and Q) receivers.

The embodiment illustrated in FIG. 5 includes many components and features that are similar to the components and features described in the embodiment illustrated in FIG. 3. For example, the embodiment illustrated in FIG. 5 comprises a LO 501, an optional optical amplifier section 502, a mixer 503 and a plurality of photodetectors 506. In various embodiments, the embodiment illustrated in FIG. 5 may include a mode converter 505 at the input interface. The embodiment illustrated in FIG. 5 further comprises a tunable polarization rotator 504 disposed between the output of the LO 501 and the input of the optical mixer 503. The tunable polarization rotator 504 may be similar to the various embodiments of the polarization rotator described with reference to FIGS. 2A-2C. The output of the tunable polarization rotator can be tuned to match the polarization of the optical signal generated by the LO 501 to the polarization of the incoming modulated optical signal coupled in to the device through an optical interface. This can be advantageous in efficiently mixing the two optical signals in the optical mixer 503.

Embodiment 4

Figure 6:
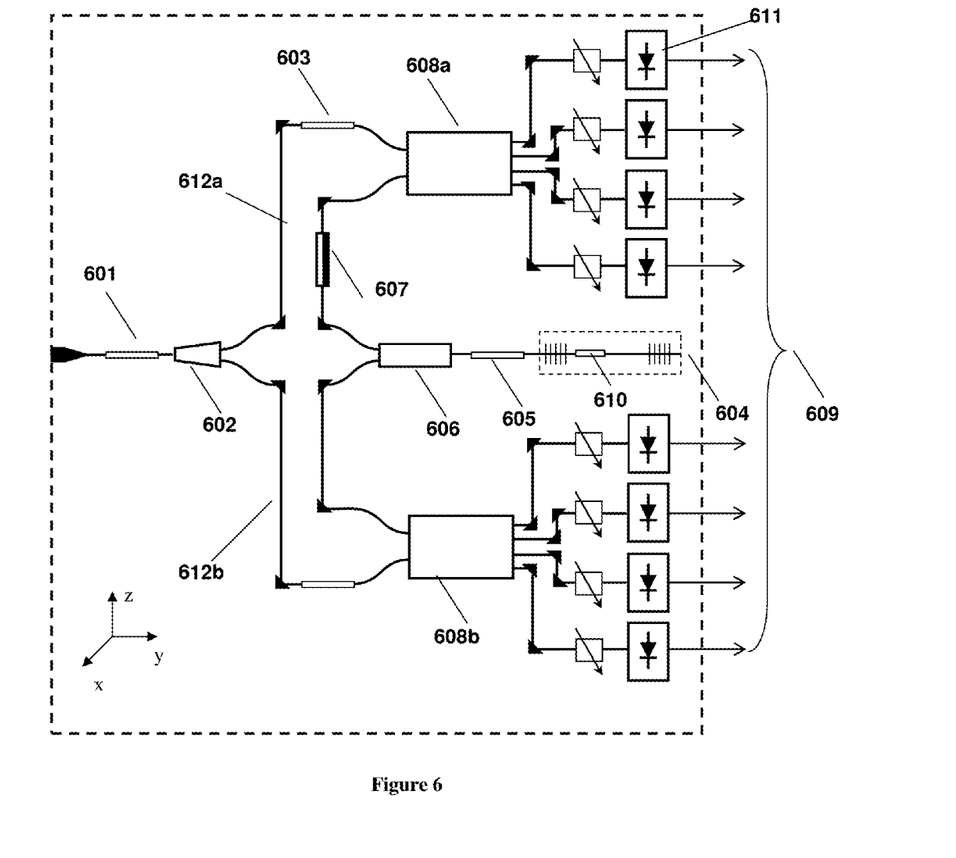
FIG. 6 schematically illustrates a folded polarization diverse I/Q receiver including a tunable laser, 1×2 input light splitter, polarization rotation elements, and two sets of full I/Q receivers, one for each polarization.

FIG. 6 illustrates another embodiment of a coherent receiver device. As discussed above, the illustrated receiver device can be formed on a common substrate comprising at least one monocrystalline substrate. The receiver comprises an input waveguide configured to receive an external modulated optical signal, an optional optical amplifier 601 that can be used to compensate for coupling losses and passive waveguide loss, an optical splitter 602 that is configured to split the external modulated optical signal between two waveguides 612a and 612b, an optional optical amplifier 603 disposed in one or both of the output waveguides 612a and 612b that can be used to compensate for coupling losses and passive waveguide loss. The device further comprises a widely tunable local oscillator 604 comprising a front and a back mirror and a tuning section 610 that can be integrated on a separate waveguide formed on the common substrate. An optional optical amplifier 605 can be disposed at the output of the laser 604. In the illustrated embodiment, the optical radiation from the LO laser 604 is split between two output waveguides of an optical 1×2 mixer structure 606. In various embodiments, a polarization rotator 607 can be integrated with one of the output waveguides of the mixer 606. The polarization rotator can be configured to rotate the optical polarization of the radiation emitted from the LO (e.g. from TE to TM polarization) to match the two possible polarization states of the received modulated optical signal. In some embodiments, the polarization rotator 607 can be integrated with either waveguide 612a or waveguide 612b such that input polarization of the external modulated optical signal is rotated instead. The emitted radiation from the LO can be mixed with the received modulated optical signal in two 2×4 optical mixers 608a and 608b. For example, the TE component of the received modulated optical signal can be combined with the TE component of the laser light emitted from the LO in the mixer 608a, while the TM component of the received modulated optical signal can be combined with the TM component of the laser light emitted from the LO in the mixer 608b.

Following similar balancing and detection techniques as described above, the output 609 from each of the eight photo detectors 611 can be used to obtain the full phase information for each of the received TE and TM polarizations. As discussed above with reference to FIG. 3, the optical phase information can be used to derive a control signal which can be used to change the optical frequency (or wavelength) of the LO.

Embodiment 5

Figure 7:
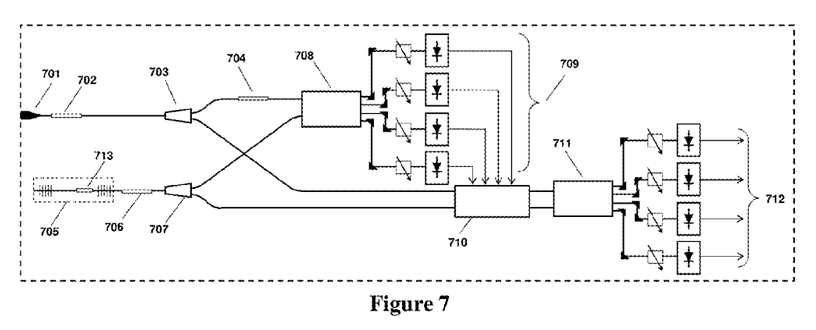
FIG. 7 schematically illustrates an optical receiver configuration including optical carrier recovery function.

FIG. 7 illustrates another embodiment of a coherent receiver. As discussed above, the illustrated receiver device can be formed on a common substrate comprising at least one monocrystalline substrate. The receiver comprises an input waveguide including a mode converter 701 configured to receive an external modulated optical signal, an optional optical amplifier 702 that can be used to compensate for coupling losses and passive waveguide loss, and an optical splitter 703 that is configured to split the external modulated optical signal between two waveguides. An optical amplifier 704 can be integrated with one of the output waveguides of the coupler 703. The device further comprises a widely tunable local oscillator 705 comprising a front and a back mirror and a tuning section 713 that can be integrated on a separate waveguide formed on the common substrate. In some embodiments, an optional optical amplifier 706 can be disposed at the output of the laser 705. In the illustrated embodiment, the optical radiation the LO laser 705 is split between two output waveguides of an optical 1×2 mixer structure 707. A first part of the received modulated optical signal and a first part of the LO laser signal is mixed in a 2×4 optical mixer structure 708. Each of the four optical outputs from the mixer is detected by four photodiodes 709. The detected photocurrent from the photodiodes is provided to an optical modulator 710. In some embodiments, the optical modulator 710 is configured to receive only the second part of the LO laser signal. In some embodiments, the optical modulator 710 can be configured to receive both, the second part of the LO laser signal and the second part of the received modulated optical signal.

The output of the optical modulator 710 can be coupled into a 2×4 optical mixer structure 711. Each of the four optical outputs from the mixer 711 can be detected by four photodiodes 712. The detected photocurrent from the photodiodes can be used to generate a control signal that can be applied to the tuning section 713 in the LO laser 705. In those embodiments, where the received modulated optical signal is QPSK modulated, the first detector array 709 can detect the in-phase and quadrature data. The photocurrent from the detector array 709 can then modulate the input signal in a manner such that the QPSK modulation is cancelled out and the optical carrier is recovered.

In various embodiments, the various integrated optical receiver architectures and components can be monolithically integrated on a common substrate with the various integrated transmitter architectures and components such as those described in U.S. Provisional App. No. 61/182,017 filed on May 28, 2009 titled "Chip-Based Advanced Modulation Format Transmitter," which is hereby expressly incorporated herein by reference in its entirety.

While the foregoing detailed description discloses several embodiments of the present invention, it should be understood that this disclosure is illustrative only and is not limiting of the present invention. It should be appreciated that the specific configurations and operations disclosed can differ from those described above, and that the apparatus and methods described herein can be used in contexts. Additionally, components can be added, removed, and/or rearranged. Additionally, processing steps may be added, removed, or reordered. A wide variety of designs and approaches are possible.

The examples described above are merely exemplary and those skilled in the art may now make numerous uses of, and departures from, the above-described examples without departing from the inventive concepts disclosed herein. Various modifications to these examples may be readily apparent to those skilled in the art, and the generic principles defined herein may be applied to other examples, without departing from the spirit or scope of the novel aspects described herein. Thus, the scope of the disclosure is not intended to be limited to the examples shown herein but is to be accorded the widest scope consistent with the principles and novel features disclosed herein. The word "exemplary" is used exclusively herein to mean "serving as an example, instance, or illustration." Any example described herein as "exemplary" is not necessarily to be construed as preferred or advantageous over other examples.

What is claimed is:

1. A monolithically integrated optical receiver die comprising:
    an input interface;
    at least one monocrystalline substrate;
    a tunable laser resonator monolithically integrated with the substrate, said tunable laser resonator comprising an output reflector and a tuning section, said tunable laser resonator configured to emit optical radiation from the output reflector along an optical axis, such that the wavelength of the emitted optical radiation is tunable over a wide wavelength range from between about 15 nm to about 100 nm, wherein the wide wavelength range is represented by $\Delta\lambda/\lambda$ and is configured to be greater than a ratio $\Delta n/n$, wherein $\lambda$ represents the wavelength of the optical radiation, $\Delta\lambda$ represents the change in the wavelength of the optical radiation, n represents the refractive index of the tuning section, and $\Delta n$ represents the change in the refractive index of the tuning section;
    a first optical mixer monolithically integrated with the substrate such that the first optical mixer is disposed at a distance less than approximately 750 μm from the input interface as measured along the optical axis, said first optical mixer having at least a first and a second input waveguide and a plurality of output waveguides, said first input waveguide of the first optical mixer optically connected to the laser resonator, said second input waveguide of the first optical mixer configured to receive a modulated optical signal from the input interface;
    a second optical mixer monolithically integrated with the substrate such that the second optical mixer is disposed at a distance less than approximately 750 μm from the input interface as measured along the optical axis, said second optical mixer having at least a first and a second input waveguide and a plurality of output waveguides, said first input waveguide of the second optical mixer optically connected to the laser resonator, said second input waveguide of the second optical mixer configured to receive said modulated optical signal from the input interface;
    a polarization rotator monolithically integrated with the substrate, said polarization rotator arranged at an angle between about 20 deg and 160 deg or between about −20 deg and −160 deg with respect to the optical axis; and
    a plurality of photodetectors monolithically integrated with the substrate, each of the plurality of photodetectors being optically connected to one of the plurality of output waveguides of the first or the second optical mixer.

2. The optical receiver die of claim 1, wherein the substrate comprises at least one of Si, InP, InAlGaAs, InGaAsP, InGaP, GaAs or InGaAs.

3. The optical receiver die of claim 1, wherein the substrate has a crystallographic axis, and wherein the optical axis of the laser resonator is aligned parallel to the crystallographic axis.

4. The optical receiver die of claim 1, wherein the modulated optical signal has a modulation bandwidth between about 5 GHz to about 50 GHz.

5. The optical receiver die of claim 1, wherein the plurality of photodetectors have a bandwidth between about 5 GHz to about 50 GHz.

6. The optical receiver die of claim 1, wherein the first and second optical mixers each have at least four output waveguides.

7. The optical receiver die of claim 1, wherein the polarization rotator is disposed between the laser resonator and the first or second optical mixer.

8. The optical receiver die of claim 1, wherein the A polarization rotator comprises;
    an optical splitter comprising an input waveguide and at least two output waveguides;
    a plurality of electrodes disposed on each of the at least two output waveguides, of the optical splitter, said plurality of electrodes configured to control an amplitude or a phase of optical radiation propagating in the at least two output waveguides; and
    an optical coupler comprising at least one output waveguide, said optical coupler configured to receive input from the at least two output waveguides of the optical splitter.

9. The optical receiver die of claim 8, wherein the polarization rotator is configured such that a voltage between approximately 1V and approximately −6V is provided to at least one of the plurality of electrodes to control the amplitude of the optical radiation.

10. The optical receiver die polarization rotator of claim 8, wherein the polarization rotator is configured such that a current between approximately 0 mA to approximately 15 mA is provided to at least one of the plurality of electrodes to control the phase of the optical radiation.

11. A method of manufacturing a monolithically integrated optical receiver die, the method comprising:
    providing an input interface;
    providing at least one monocrystalline substrate;

monolithically integrating a tunable laser resonator with the substrate, said tunable laser resonator comprising an output reflector and a tuning section, said tunable laser resonator configured to emit optical radiation from the output reflector along an optical axis, such that the wavelength of the emitted optical radiation is tunable over a wide wavelength range from between about 15 nm to about 100 nm, wherein the wide wavelength range is represented by $\Delta\lambda\lambda$ and is configured to be greater than a ratio $\Delta n/n$, wherein $\lambda$ represents the wavelength of the optical radiation, $\Delta\lambda$ represents the change in the wavelength of the optical radiation, n represents the refractive index of the tuning section, and $\Delta n$ represents the change in the refractive index of the tuning section;

monolithically integrating a first optical mixer with the substrate such that the first optical mixer is disposed at a distance less than approximately 750 μm from the input interface as measured along the optical axis, said first optical mixer having at least a first and a second input waveguide and a plurality of output waveguides, said first input waveguide of the first optical mixer optically connected to the laser resonator, said second input waveguide of the first optical mixer configured to receive a modulated optical signal from the input interface;

monolithically integrating a second optical mixer with the substrate such that the second optical mixer is disposed at a distance less than approximately 750 μm from the input interface as measured along the optical axis, said second optical mixer having at least a first and a second input waveguide and a plurality of output waveguides, said first input waveguide of the second optical mixer optically connected to the laser resonator, said second input waveguide of the second optical mixer configured to receive said modulated optical signal from the input interface;

monolithically integrating a polarization rotator with the substrate, said polarization rotator arranged at an angle between about 20 deg and 160 deg or between about −20 deg and −160 deg with respect to the optical axis; and monolithically integrating a plurality of photodetectors with the substrate, each of the plurality of photodetectors being optically connected to one of the plurality of output waveguides of the first or the second optical mixer.

12. The method of claim 11, wherein monolithically integrating a polarization rotator with the substrate comprises providing an asymmetric waveguide structure on the substrate.

13. The method of claim 11, wherein the monocrystalline substrate comprises at least one of Si, InP, InAlGaAs, InGaP, InGaAsP, GaAs or InGaAs.

* * * * *